US012491660B2

(12) United States Patent
Hahs et al.

(10) Patent No.: US 12,491,660 B2
(45) Date of Patent: Dec. 9, 2025

(54) VIBRATION DEVICE WITH SELF-ADJUSTING IMPACT BARS

(71) Applicant: HESS GROUP GmbH, Burbach-Wahlbach (DE)

(72) Inventors: Ralf Hahs, Bad Marienberg (DE); Sebastian Bergmann, Höchstenbach (DE)

(73) Assignee: HESS GROUP GMBH, Burbach-Wahlbach (DE)

( * ) Notice: Subject to any disclaimer, the term of this patent is extended or adjusted under 35 U.S.C. 154(b) by 280 days.

(21) Appl. No.: 17/986,072

(22) Filed: Nov. 14, 2022

(65) Prior Publication Data

US 2023/0264386 A1 Aug. 24, 2023

(30) Foreign Application Priority Data

Nov. 15, 2021 (DE) ..................... 10 2021 129 740.0

(51) Int. Cl.
*B28B 1/087* (2006.01)
*B28B 3/02* (2006.01)
*H02K 7/06* (2006.01)

(52) U.S. Cl.
CPC ............ *B28B 3/022* (2013.01); *B28B 1/0873* (2013.01); *H02K 7/063* (2013.01); *B28B 2001/0876* (2013.01)

(58) Field of Classification Search
CPC ...................... B28B 1/0873; B28B 2001/0876
(Continued)

(56) References Cited

U.S. PATENT DOCUMENTS 4,830,597 A * 5/1989 Steier .................... B28B 1/0873 425/456
6,213,630 B1 * 4/2001 Kossmann ............ B28B 1/0873 366/128
(Continued)

FOREIGN PATENT DOCUMENTS

CN 202448201 9/2012 ............... B28B 3/00
CN 104029277 9/2014 ............... B28B 1/08
(Continued)

OTHER PUBLICATIONS

Wikipedia, Bevel Gear, https://de.wikipedia.org/wiki/Kegelradgetriebe, machine translation accessed Feb. 9, 2023, 18 pages German text and English.

*Primary Examiner* — David L Sorkin
(74) *Attorney, Agent, or Firm* — HAYES SOLOWAY P.C.

(57) ABSTRACT

Disclosed is a vibration device with a vibrating table for a concrete block manufacturing machine for compression of a material to be compressed. The vibration device is at least partially resiliently mounted on a machine frame and driven by at least one electric motor. As a result the vibrating table can be set in a predominantly vertical vibrating movement, wherein the vibration device has a plurality of vibrating table bars arranged parallel to one another and fastened to the vibrating table and impact bars fastened statically to the machine frame. All the impact bars are displaceable relative to the vibrating table bars and along a displacement axis running parallel to the vertical vibrating movement by a plurality of positioning devices connected to one another and driven by at least one common drive unit in order to obtain a synchronous displacement of all the impact bars.

12 Claims, 10 Drawing Sheets

(58) Field of Classification Search
USPC .......................................................... 425/456
See application file for complete search history.

(56) References Cited

U.S. PATENT DOCUMENTS

| | | | | |
|---|---|---|---|---|
| 7,025,583 | B2 * | 4/2006 | Bald | ..................... B30B 11/022<br>425/432 |
| 2004/0051197 | A1 * | 3/2004 | Bald | ..................... B30B 11/022<br>264/319 |
| 2006/0182840 | A1 * | 8/2006 | High | ..................... B28B 15/005<br>425/432 |

FOREIGN PATENT DOCUMENTS

| | | | |
|---|---|---|---|
| DE | 10 2016 004 024 | 10/2017 | ............... B28B 3/04 |
| EP | 1875996 | 1/2008 | ............. B28B 1/087 |
| WO | WO2007147422 | 12/2007 | ............... B28B 1/08 |

* cited by examiner

VIBRATION DEVICE WITH SELF-ADJUSTING IMPACT BARS

BACKGROUND OF THE INVENTION

The invention relates to a vibrating device, in particular for a concrete block manufacturing machine or a concrete block manufacturing plant, with self-adjusting impact bars.

Such vibrating devices are used for improvement of the quality by compression of different manufactured concrete products, such as for example concrete slabs or concrete blocks, during the production process. Such a vibrating device usually has a dynamically movable vibrating table with vibrating table bars, which are vibrated by electric motors, such as for example servomotors, and unbalanced shafts. As a counterpart to the vibrating table bars, impact bars are screwed rigidly to the machine frame of the vibrating device. As a result the impact bars cannot perform any movements during the vibrating movement of the vibrating table and are usually set to between 0 and 1 mm below the vibrating table bars depending upon the type of manufacturing base. During the compression process only the vibrating table bars together with the vibrating table move in an up and down movement, so that the manufacturing base resiliently clamped thereon strikes the impact bar in its downward movement.

Such vibrating table devices have the disadvantage that the impact bars have to be checked and readjusted at regular intervals. The readjustment and testing of the impact bars lasts up to 3 hours of working time and involves partial removal of individual components of the vibrating table device and/or the concrete block manufacturing machine. In this case the adjustment process is very complicated, since a fully equipped concrete block manufacturing machine hardly offers the machine operator room to work. Therefore during the readjustment and testing of the impact bars the entire concrete block manufacturing machine is shut down and their individual positions relative to the vibrating table bars are changed manually in order to avoid uneven wear of the vibrating table bars and impact bars and thus a deterioration of the quality of manufactured concrete products.

SUMMARY OF THE INVENTION

Therefore the object of the invention is to provide a vibrating device with self-adjusting impact bars which are readjusted automatically and quickly with respect to the vibrating bars.

This object is achieved by a vibrating device with a vibrating table for a concrete block manufacturing machine for compression of a material to be compressed. In essence, the vibrating device is at least partially resiliently mounted and fastened to a machine frame. The vibrating table is preferably connected to a plurality of rubber buffers which are fastened, preferably screwed onto the machine frame. The vibrating device is driven by at least one electric motor, preferably a servomotor. The unbalanced masses or unbalanced shafts installed in the vibrating table are preferably driven by at least one electric motor. In this case the vibrating table can be set in a predominantly vertical vibrating movement. The unbalanced masses or unbalanced shafts are preferably set in rotation by the servomotor, wherein as a result the vibrating table carries out a predominantly vertical up and down movement. The amplitude of the vibrating table during the vibrating movement is preferably modifiable by changing the rotational speed and/or the angular setting between the unbalanced masses. Such a vibrating device has a plurality of vibrating table bars arranged parallel to one another and fastened to the vibrating table and impact bars fastened statically to the machine frame. According to the invention all the impact bars are displaceable relative to the vibrating table bars and along a displacement axis running parallel to the vertical vibrating movement by a plurality of positioning devices connected to one another and driven by means of at least one common drive unit in order to obtain a displacement of all the impact bars. In principle, such a displacement of the impact bars can take place synchronously or asynchronously.

With the essential feature of displacing impact bars in their height relative to vibrating table bars with positioning devices, wherein all the positioning devices are driven in motion along the displacement axis by at least one drive unit, an automatic adjustment or readjustment of impact bars of such a vibrating device is possible. Each impact bar is preferably driven individually by its own drive unit, so that each positioning device is preferably individually controllable and/or motorised. Thus during the automatic adjustment of the impact bars the adjustment time can be reduced to a necessary minimum. Moreover, the entire plant can always continue the manufacturing process immediately after the adjustment of the impact bars without having to dismantle some parts of the concrete block manufacturing machine. Thus the wear on the vibrating table device and in particular on the impact bars can be significantly reduced, which in turn leads to a constant end product quality. Thus the readjustment of the impact bars of such vibrating devices takes place almost without errors due to fully automatic adjustment, since human operating errors can be largely precluded. Considered overall, such a vibrating device having self-adjusting impact bars is particularly advantageous with regard to cost saving, since not only is there significantly less wear overall on the concrete block manufacturing machine, but also the probability of producing rejects can be reduced many times.

Such vibrating devices with two positioning devices per impact bar are usually adjusted along the displacement axis. In this case the positioning devices are each mounted on the opposite ends of the respective impact bars. Thus the impact bars can be oriented vertically, and the wear on one end of the impact bar can be compensated for by an inclination.

In a preferred embodiment all of the impact bars have a wear bar connected to a support bar, and the support bar is connected by at least one fastening device to at least one positioning mechanism. The wear bar is preferably screwed to the support bar, and the support bar is mounted on or in the positioning mechanism.

Such vibrating devices preferably each have two fastening devices per impact bar, the impact bar being adjustable by the synchronous displacement of the fastening devices along the displacement axis.

The fastening device preferably has two fastening elements, preferably an upper and a lower bearing shell, the impact bar being connected by the two bearing shells to the positioning device. The upper bearing shell is preferably fastened to an upwardly facing side on the wear bar, the lower bearing shell being connected to the positioning mechanism. The upper bearing shell is preferably screwed on the underside to the lower bearing shell. The lower bearing shell is also preferably connected on the underside to a housing for the positioning mechanism, in order to protect the positioning mechanism against external influences. The connection between the lower bearing shell and the housing by the positioning mechanism may essentially constitute a mounting.

The support bar is preferably mounted between the upper and lower bearing shell, wherein during actuation of the displacement mechanism the entire fastening device can be varied in height along the displacement axis and thus the impact bar is adjustable relative to vibrating table bars.

It is also conceivable that the impact bars can be brought into an oblique position by the positioning devices. The surface of each impact bar is preferably adjustable by the positioning device in an angle of inclination with respect to the horizontally oriented vibrating table bars. The positioning mechanism preferably also has means for adjusting angles of inclination of the surface of the impact bar in order to be able to set the impact bar in a desired oblique position. The consequence of this is that in the event of uneven wear of the impact bars, this can be counteracted by the oblique positioning of the impact bars.

It is conceivable that by such a fastening device an impact bar can be set at an angle with respect to the vibrating table bars. It is conceivable that the first fastening element has substantially the shape of a milled cylinder and the second fastening element has substantially the shape of a cuboid. Thus the first fastening element can preferably be inserted rotatably into the second fastening element. In this case the upper bearing shell can preferably be rotated inside the lower bearing shell about a centre axis of the upper bearing shell. The centre axis preferably extends parallel to a spreading direction of the impact bars. A rotary movement about the centre axis is preferably suitable and intended for setting an angle of inclination of the surface of the impact bar. As a result the impact bar can be set particularly simply in a desired oblique position.

In a further preferred embodiment the positioning mechanism has an upper wedge element and a lower wedge element connected to a shaft. The lower wedge element is preferably displaceable along an axis extending parallel to the impact bars by the rotation of the shaft. In this way the upper wedge element can be adjusted along the displacement axis, the upper wedge element sliding on its oblique lower surface along an oblique upper surface of the lower wedge element.

The shaft, preferably a spindle, is provided with a thread in order to convert a rotary movement into a longitudinal movement.

The lower wedge element preferably has a horizontal surface which is arranged opposite the oblique surface of the lower wedge element. An oblique lower surface of the upper wedge element is preferably arranged parallel to the oblique surface of the lower wedge element. The oblique surfaces of the lower and the upper wedge element are preferably connected to one another by the frictional locking. It is conceivable that the oblique surfaces of the two wedge elements are coated with a suitable lubricant for better sliding.

It is also conceivable that the oblique surfaces of the lower and the upper wedge element can be arranged at an angle to a normal vector of the impact bar in order to achieve an inclined setting of the impact bar. Preferably in this case the oblique surfaces of the lower and of the upper wedge element can each be skewed in such a way that the impact bar can be set at an angle of inclination with respect to the at least adjacent horizontally oriented vibrating table bar.

The lower and the upper wedge element are preferably movable inside the housing along an axis perpendicular to the displacement axis. The movement can take place either along the axis running parallel to the impact bars, or horizontally, or the axis running perpendicularly to the impact bars, or vertically.

The lower wedge element preferably has a thread which is connected to the shaft or the spindle of the positioning mechanism. The lower wedge element is preferably displaceable along an axis extending parallel to the impact bars by the rotation the shaft.

In a further embodiment the upper wedge element is connected to a fastening element of the fastening device in order to move the impact bar along the displacement axis. It is also conceivable that the upper wedge element is a part of the fastening element.

The lower bearing shell of the fastening device is preferably connected to the upper wedge element. Thus it is conceivable that the lower bearing shell and the upper wedge element are glued, screwed or dowelled to one another. Alternatively it is also conceivable that the lower bearing shell and the upper wedge element are formed as an entire fastening element. This presupposes that the housing of the positioning mechanism has a recess into which the upper wedge element can be inserted. The recess is preferably arranged on an upwardly facing side of the housing.

The upper and the lower wedge element are preferably arranged in a cavity inside the housing, the cavity having a basic shape of a cube segment. All lateral walls of the upper wedge element preferably touch the walls of the cavity. However, at least two of the lateral walls of the lower wedge element touch the lateral walls of the cavity. It is conceivable that at a maximum or minimum height setting of the impact bar, three of the lateral walls of the lower wedge element touch the lateral walls of the cavity. During adjustment of the impact bar the lower wedge element preferably slides along the lateral walls of the cavity, whilst the upper wedge element is displaced along the oblique side of the lower wedge element.

In a further embodiment the positioning mechanism has a worm gear and a worm shaft, wherein by the rotation of the worm shaft the fastening device connected to the worm gear is adjustable along the displacement axis, and the worm gear is meshed on the front face with the worm shaft.

Accordingly the positioning mechanism preferably constitutes a so-called worm gear unit, and during one revolution the worm shaft advances by one or more teeth of the worm gear. In this case the worm gear is preferably arranged below the lower bearing shell. The worm gear preferably has an internal thread which meshes with a thread of a screw element, preferably a spindle, in order to connect the fastening device to the worm gear. At the top the screw element is mounted at least partially inside the lower bearing shell. Due to the rotation of the worm gear the screw element can be adjusted along the displacement axis, and due to the resulting displacement the impact bar can be continuously adjusted relative to the vibrating bars.

Alternatively it is conceivable that the positioning mechanism has a stepping gear, for example a cylinder cam gear or a globoid gear. Due to such a stepping gear it is possible on the basis of the cyclical movement of the worm gear to adjust the screw element step by step along the displacement axis. It is particularly advantageous in this case that the resulting displacement of the impact bar relative to the vibrating table bars is then preferably adjustable step by step. In principle all known types of gearbox are conceivable as positioning mechanism.

In a further preferred embodiment the positioning mechanism has a spur gear meshed with a spur gear shaft and connected to the fastening device, wherein by the rotation of the spur gear shaft the fastening device is adjustable along the displacement axis.

Accordingly the positioning mechanism can also constitute a spur gear unit, two spur gears or the spur gear and the spur gear shaft being meshed with one another. The spur gear is preferably arranged below the lower bearing shell, wherein inside the spur gear a screw element, preferably a spindle, is meshed with an internal thread of the spur gear in order to connect the fastening device to the spur gear. By the rotation of the spur gear shaft the screw element can be displaced along the displacement axis, in order to adjust the impact bar along the displacement axis. The screw element is mounted slidably at least partially inside the fastening device, preferably onside the lower bearing shell.

It is conceivable that all the positioning devices are connected to one another mechanically, hydraulically, pneumatically and/or electronically, in order to displace the impact bars along the displacement axis and so to adjust them relative to the vibrating table bars.

A mechanical connection of the individual positioning devices preferably involves at least one common connecting element, which by its shape is suitable for transmitting a drive movement synchronously to all the positioning devices. Alternatively the positioning devices can be driven individually by means of a plurality of drive units, the number of driving devices corresponding to the number of positioning devices. The positioning devices are then preferably connected to one another electronically by means of the adjustment of the drive unit in order to allow the synchronous displacement of the impact bars. The drive units are preferably connected to a common signal source by wired and electronic means, and the signal source transmits an electrical signal to all the driving devices in order to drive the drive units synchronously.

In a preferred embodiment the positioning devices have torque transmission devices which indirectly connect the positioning mechanisms to at least one drive unit in a retaining device alongside and/or below the vibrating table.

The drive unit is intended to generate a torque, and this is transmitted simultaneously to at least one positioning device. The drive unit is preferably an electric motor or another motor which generates a rotating movement.

The retaining device is preferably screwed at least partially statically to the machine frame, to the sides of a pit or to the foundation below the machine frame of the concrete block manufacturing machine in order to fasten the drive unit in a space-saving manner. Two retaining devices are preferably each fastened alongside and/or below the vibrating table and along an axis running perpendicularly to the impact bars. In a particularly limited installation space inside the vibrating device, it is conceivable that the retaining device is arranged below the vibrating table on a lateral wall of the machine frame.

In this case the common drive unit and the retaining device preferably constitute a common connecting element in order to connect the positioning devices mechanically to one another.

The retaining device preferably has means for transmission of torque to the torque transmission devices. For example such means can be a chain, a cardan shaft or a toothed belt. Particularly preferably the retaining device can have a chain or a toothed belt which is flange-mounted on the retaining device. Thus the driving device can preferably drive the chain or the toothed belt for rotation, this rotating movement being transmitted to the gears. Alternatively the retaining device can have guide rollers which transmit the torque of the drive unit to all the torque transmission devices and thus indirectly connects the drive unit to the positioning mechanisms.

The number of gears preferably corresponds to the number of positioning devices arranged at one end of the impact bar, so that two drive units are required for a synchronous adjustment of all the impact bars. Alternatively the adjustment of the impact bars can also take place with one or more drive units by a further chain or toothed belt being gripped between the two ends of all the impact bars. In a particularly advantageous embodiment the adjustment of the impact bars at both ends would be possible with one drive unit.

In a preferred embodiment, the torque transmission device has a cardan shaft which is suitable and intended for transmission of a torque to the positioning devices.

In a further preferred embodiment, the torque transmission device has a toothed belt which is suitable and intended for transmission of a torque to the positioning devices.

In a further embodiment the positioning device has an angular gear which transmits the torque predetermined by the drive unit to the positioning mechanism by an angle, the angular gear being connected to the torque transmission device.

It is conceivable that the angular gear is for example a bevel gear or a hypoid gear. In principle any type of angular gears is possible with regard to the type of toothing or a combination of different types of toothing.

The angular gear is preferably used in a combination of the spur gear unit and the toothed belt or the cardan shaft, in order to transmit the rotating movement to the spur gear and thus to displace the impact bars in their height and along the displacement axis by means of the positioning device.

In a further preferred embodiment the vibrating device is adjustable in such a way that in a standby state the impact bars are arranged below the vibrating table bars or span a common plane. Alternatively it would also be conceivable to adjust the vibrating device, with the impact bars being arranged above the vibrating table bars in the standby state of the vibrating device.

The position of the impact bars along the displacement axis is dependent on the material of a manufacturing base used in the manufacturing process. When a manufacturing base made of wood is used the impact bars are preferably to be adjusted in a range from 1.2 mm to 0.7 mm, preferably 1 mm, below the vibrating table bars. When a manufacturing base made of plastics material is used the impact bars are to be adjusted in a range from 0.7 mm to 0.3 mm, preferably 0.6 mm, below the vibrating table bars. When manufacturing bases made of steel are used the impact bars are to be adjusted in such a way that with the vibrating table bars they span a common plane.

Furthermore, the present invention is directed to concrete block manufacturing machines for compression of a material to be compressed. The previously described vibrating table device can be considered as a part of the concrete block manufacturing machine. Accordingly the concrete block manufacturing device has a vibrating device with a vibrating table, with the vibrating device being at least partially resiliently mounted on a machine frame and driven by at least one electric motor and as a result the vibrating table can be set in a predominantly vertical vibrating movement. The vibrating device of such a concrete block manufacturing machine has a plurality of vibrating table bars arranged parallel to one another and fastened to the vibrating table and impact bars screwed statically to the machine frame. According to the invention all the impact bars of such a concrete block manufacturing plant are displaceable relative to the vibrating table bars and along a displacement axis running parallel to the vertical vibrating movement by a plurality of positioning devices connected to one another and driven by means of at least one common drive unit.

BRIEF DESCRIPTION OF THE DRAWINGS

Further objects, advantages, features and possible applications of the present invention are apparent from the following description of embodiments with reference to the drawings. In this case all the features described and/or illustrated, considered alone or in any sensible combination, form the subject of the invention, also independently of their combination in the claims or their dependencies.

In the drawings.

DETAILED DESCRIPTION OF THE INVENTION

Figure 1:
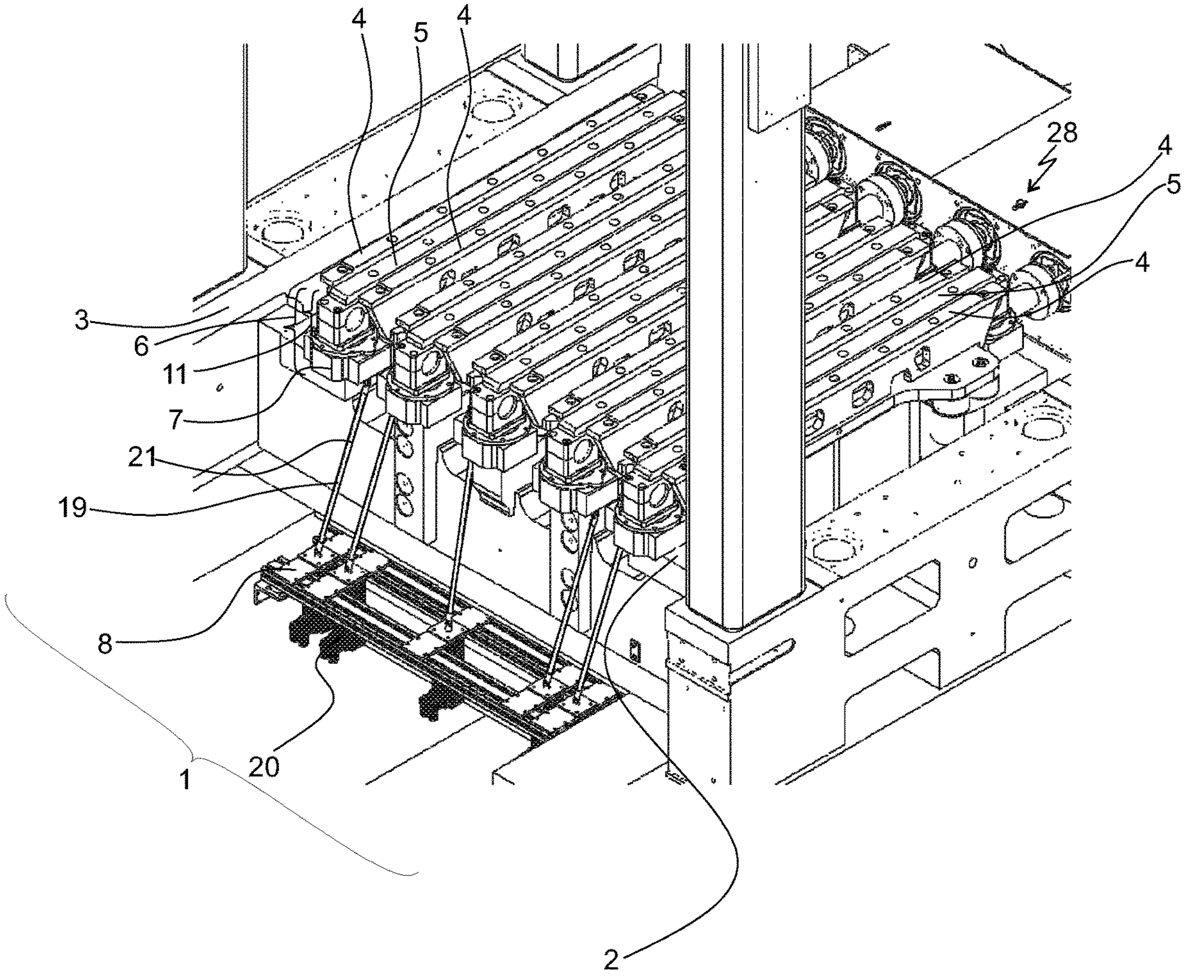
FIG. 1 shows a perspective view of a concrete block manufacturing plant with a vibrating device and a plurality of impact bars which can be adjusted by positioning devices.

FIG. 1 shows a perspective view of a concrete block manufacturing plant 28 with a vibrating device 1 and a plurality of impact bars 5 which can be set and adjusted by positioning devices 6. The illustrated vibrating device has a vibrating table 2 with vibrating table bars 4 which are screwed to a machine frame 3 of the concrete block manufacturing device 28. The illustrated impact bars 5 can be adjusted in height relative to the vibrating table bars 4 by the adjusting devices 6.

A generic vibrating device 1 typically has overall five impact bars 5 and ten vibrating table bars 4. In this case each impact bar 5 is arranged between two vibrating table bars 4. A different number of impact bars 5 and vibrating table bars 4 would likewise be conceivable.

The illustrated adjusting devices 6 have fastening devices 11 and positioning mechanisms 7. The positioning mechanisms 6 are mechanically connected to drive units 20 by means of torque transmission devices 19. In the illustrated embodiment the concrete block manufacturing device 28 the torque devices 19 are designed as cardan shafts 21.

The drive units 20 are fastened below a common retaining device 8. The retaining device 8 is preferably fastened laterally to the vibrating device 1 in a pit.

Figure 2:
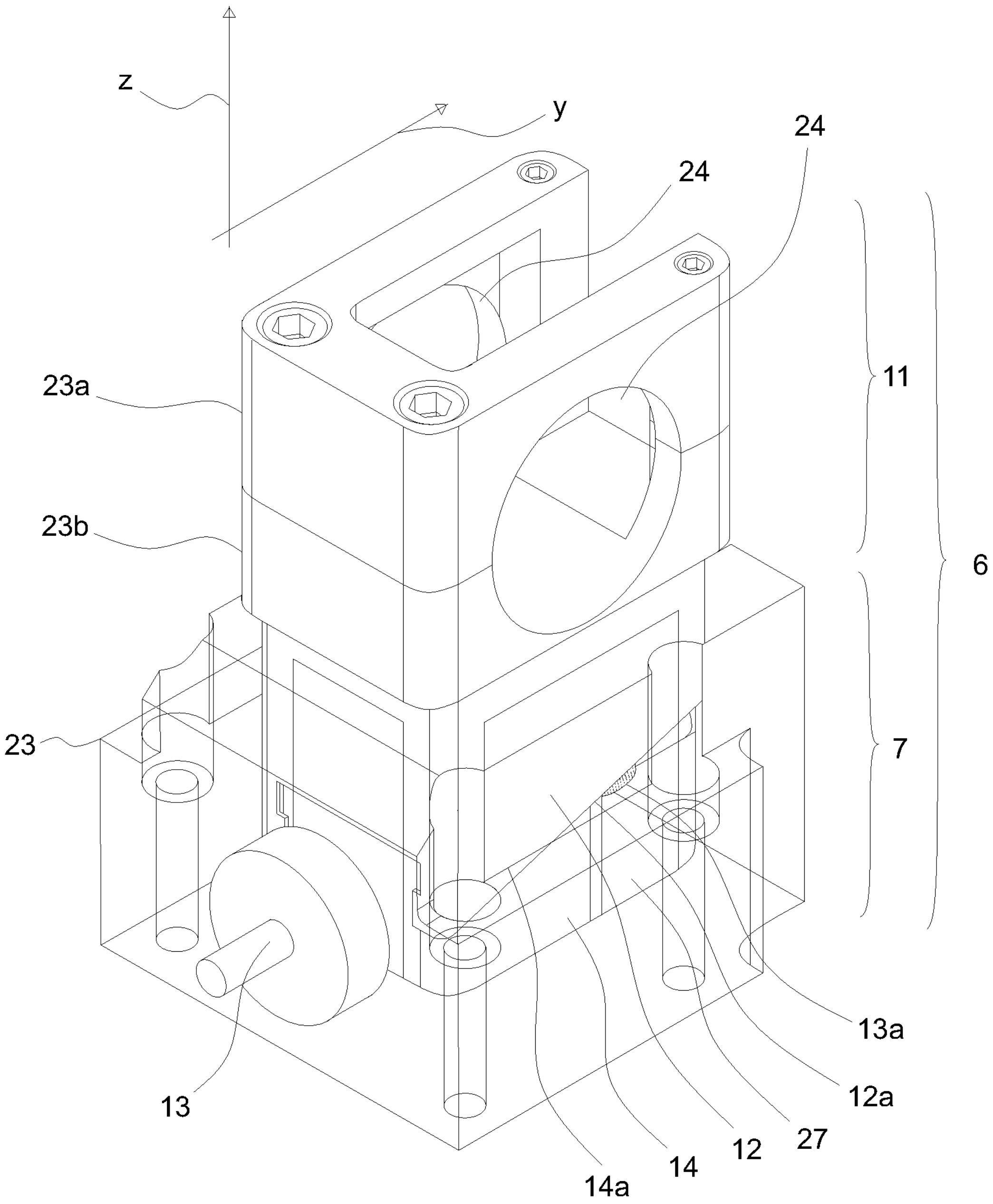
FIG. 2 shows a perspective view of a positioning device of an impact bar according to a first embodiment of the invention.

FIG. 2 shows a perspective view of a positioning device 6 of an impact bar 5 according to a first embodiment of the invention. The illustrated positioning device has an upper part, which is designed as a fastening device 11 for the impact bar 5, and a lower part, which is designed as a positioning mechanism 7. The fastening device is intended for fastening of the impact bar and has an upper bearing shell 23*a* and a lower bearing shell 23*b*, which has an upper wedge element 12, and the impact bar 5 can be inserted at least partially between the bearing shells. Each bearing shell has a recess 24, wherein, when the bearing shells are screwed together, the recesses together have a round basic shape. In the illustrated embodiment of the positioning device the lower bearing shell together with an upper part of the positioning mechanism 7, which is shown as an upper wedge element 12, is illustrated as one single component.

The positioning mechanism 7 is protected by a housing 23 against external influences and has an upper wedge element 12, a lower wedge element 14 and a shaft 13. The positioning mechanism is intended to displace the fastening device along a displacement axis z by the rotation of the shaft 13, in order thereby to set a required position of the impact bar. For this purpose the upper wedge element 12 has an oblique lower surface 12*a* and the lower wedge element 14 has an oblique upper surface 14*a*, wherein the two oblique surfaces are connected to one another so as to be complementary, are touching one another and are preferably guided by a T-slot. Furthermore, the lower wedge element 14 is mechanically connected rotatably to the shaft 13 by a thread (illustrated in FIG. 2*a*).

The housing 23 for the positioning mechanism 7 has a cavity 27 into which the wedge elements and the shaft are inserted. The cavity 27 preferably has a cube shape, in which the upper wedge element 12 slides with its likewise cube-like basic shape along the perpendicular sides in a displacement movement. The lower wedge element 14 is arranged in the lower region of the cavity 27 and slides along the two perpendicular sides of the cavity arranged parallel to one another during a relative movement caused by the rotation of the shaft. Furthermore, the housing 23 has two recesses 28*a*, 28*b* (reproduced in FIG. 2*a*) arranged parallel to one another on the perpendicular sides of the housing for the shaft and a further recess 28*c* (reproduced in FIG. 2*a*) on an upper side of the housing for the upper wedge element. The cavity 27 of the housing 23 forms the recess for the upper wedge element 12.

Figure 2A:
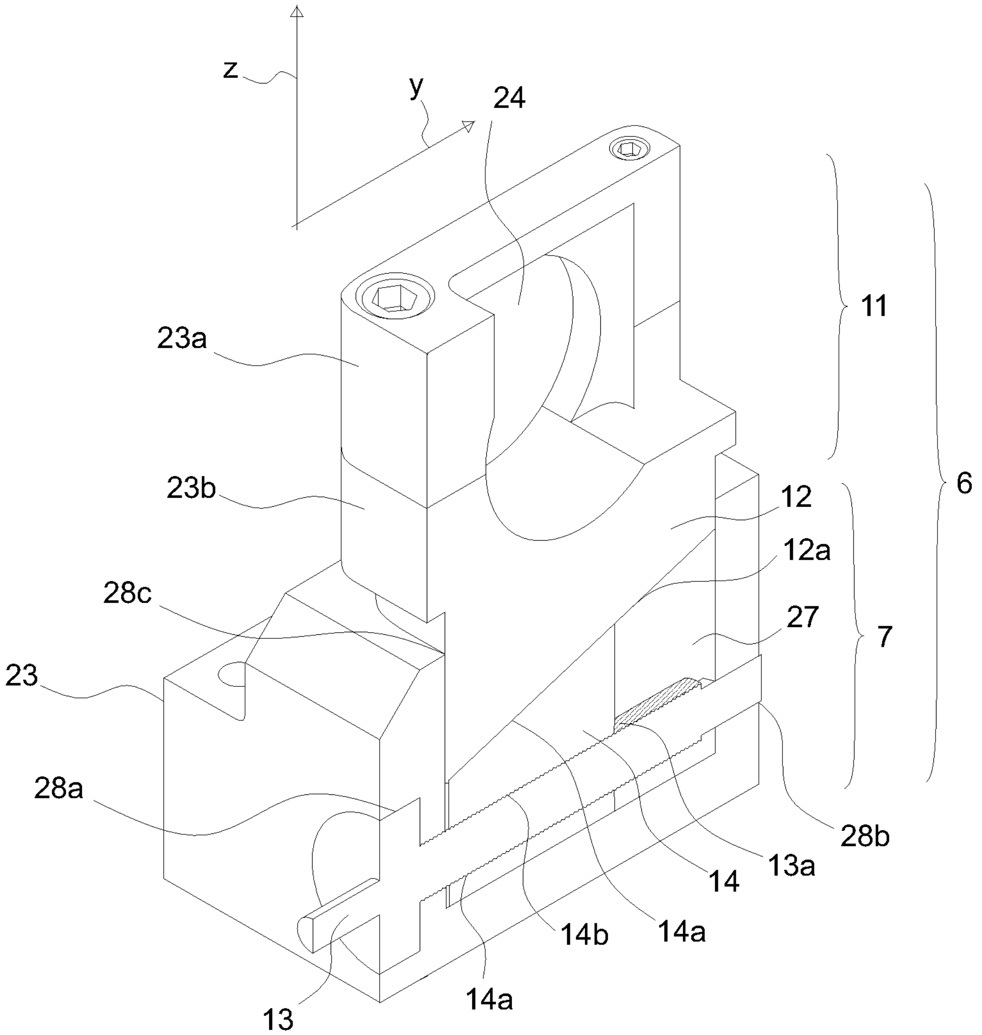
FIG. 2*a* shows a perspective cross-sectional representation of a positioning device of an impact bar according to a first embodiment of the invention.

FIG. 2*a* shows a perspective cross-sectional representation of the positioning device 6 from FIG. 2. The lower wedge element 14 has a thread 14*a* on its underside, into which a thread 13*a* of the shaft 13 is introduced. It is also conceivable that the lower wedge element 14 has a recess which is provided with a thread. In such a case, the shaft can be inserted into the recess of the lower wedge element 14 in order to mesh the shaft with the lower wedge element. The shaft is preferably designed as a spindle which is inserted into the recess 28*a* of the housing 23, the thread 13*a* of the shaft being arranged predominantly inside the cavity 27.

Figure 2B:
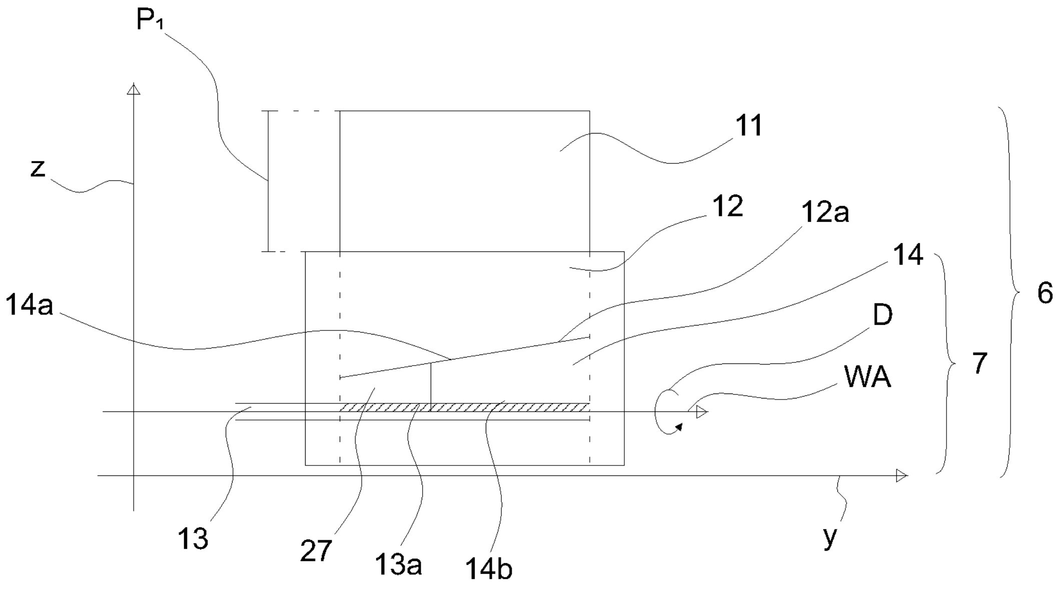
FIG. 2*b* shows a schematic representation of a positioning device of an impact bar according to a first embodiment of the invention in a first position.
Figure 2C:
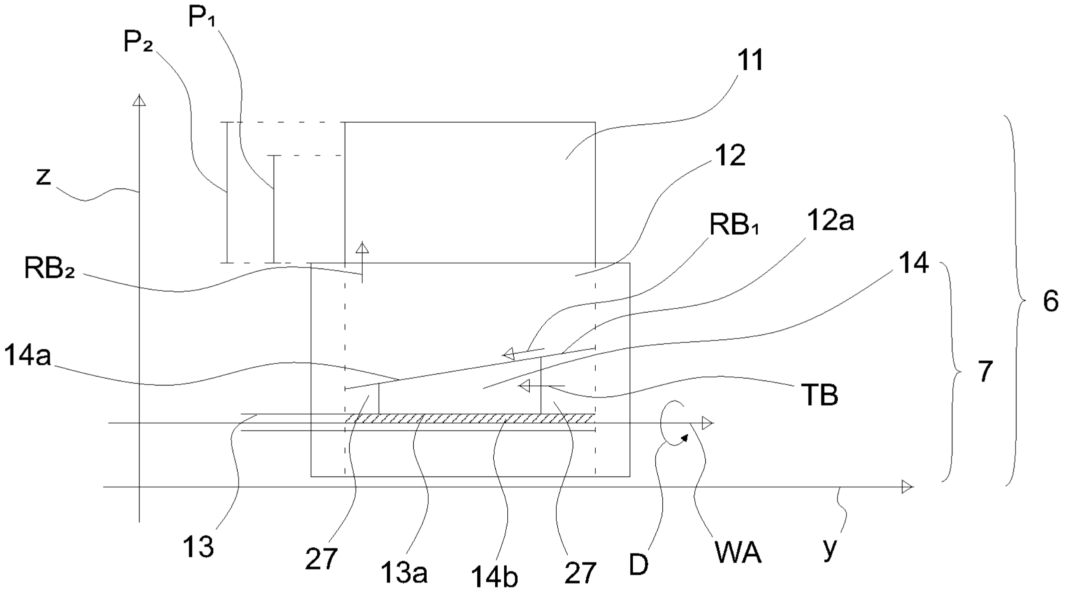
FIG. 2*c* shows a schematic representation of a positioning device of an impact bar according to a first embodiment of the invention in a second position.

FIGS. 2*b* and 2*c* show schematic representations of the positioning device 6 illustrated in FIG. 2 in a first set position P1 and a second set position P2. The positioning device shown is displaceable along a displacement axis z. In this case the position P1 constitutes a starting position and the position P2 is a desired set position of the positioning device. The position P2 is distinguished by the fact that the fastening device 11 can be set higher overall by comparison with the position P1 by a relative movement RB2, measured along the displacement axis z. This relative movement RB2 is a direct reaction to the relative movement RB1 of the lower wedge element 14 and the rotary movement D of the shaft 13. While the shaft 13 is rotated about its shaft axis WA, this turning movement D is transmitted by its thread 13*a* to the thread 14*b* of the lower wedge element 14 as a translational movement TB along an axis y perpendicular to the displacement axis. The translational movement TB of the lower wedge element 14 is transmitted via its oblique upper surface 14*a* to the upper wedge element 12 by sliding along the oblique lower surface 12*a*. This results in a relative movement RB1 between the upper wedge element 12 and the lower wedge element 14, which leads to a relative movement RB2.

Figure 3:
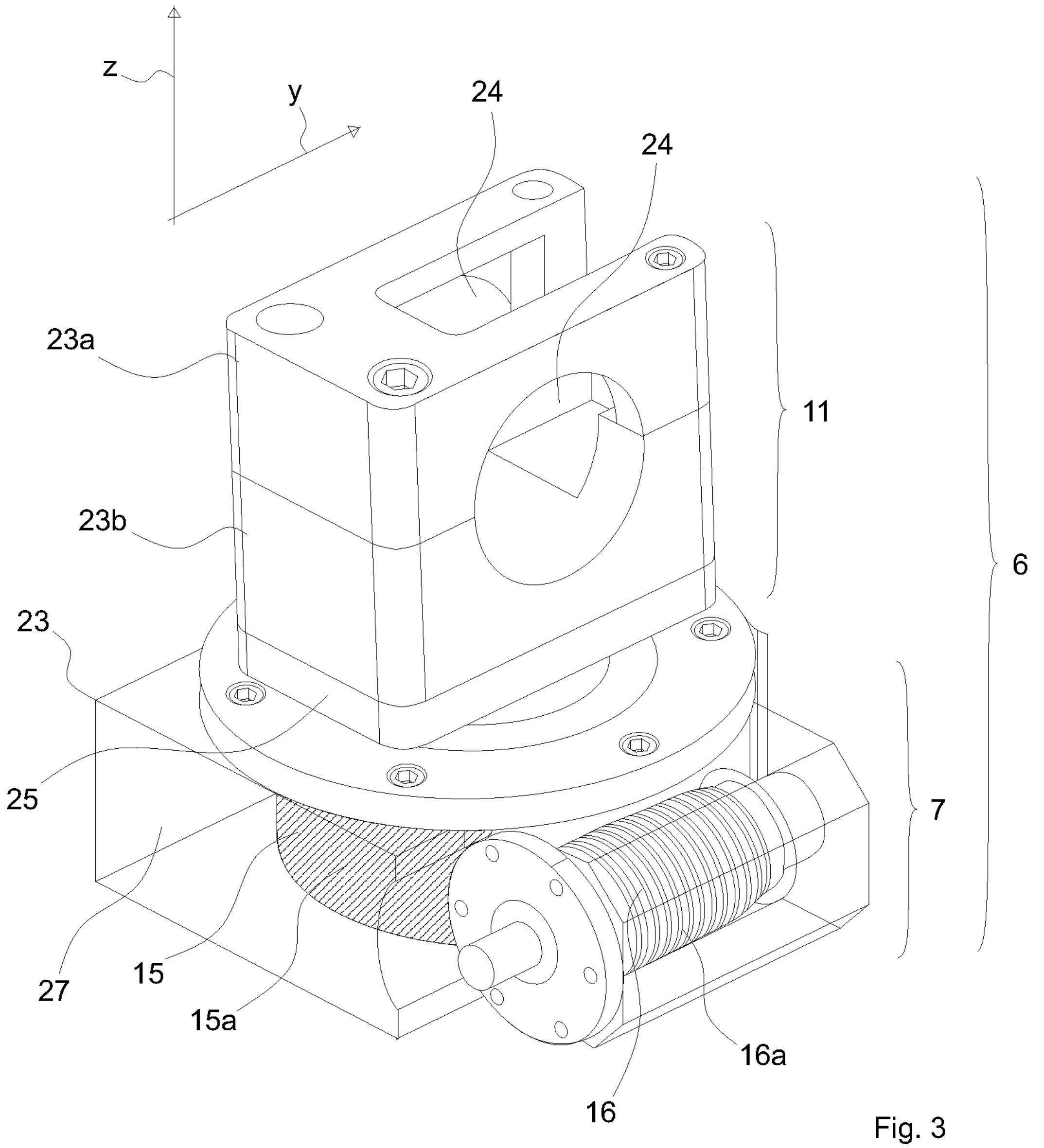
FIG. 3 shows a perspective representation of a positioning device of an impact bar according to a second embodiment of the invention.

FIG. 3 shows a perspective view of a positioning device 6 of an impact bar 5 according to a second embodiment of the invention. The positioning device 6 illustrated here has a fastening device 11 with two bearing shells 23*a*, 23*b*, a positioning mechanism 7 and a bearing element 25. It is conceivable that the bearing element 25 is a sliding bearing.

An impact bar can be at least partially arranged and screwed between the bearing shells. In principle, the fastening device 11 is similar to the fastening device illustrated in FIG. 2. The difference is merely that the lower bearing shell 23*b* is connected to a screw element 26 (illustrated in FIG. 3*a*) via the bearing element 25.

The positioning mechanism 7 is a so-called worm gear unit and has a worm shaft 16 with a thread 16*a*, a worm gear 15 with a plurality of teeth 15*a* and the screw element 26 arranged inside the worm gear. The thread 16*a* is meshed with the teeth 15*a*, the worm gear 15 being screwed to the screw element 26 (illustrated in FIG. 3*a*). The positioning mechanism 7 is accommodated in a cavity 27 of a housing 23 which protects the components of the positioning mechanism located therein against contamination, the effects of extraneous forces and moisture.

Figure 3A:
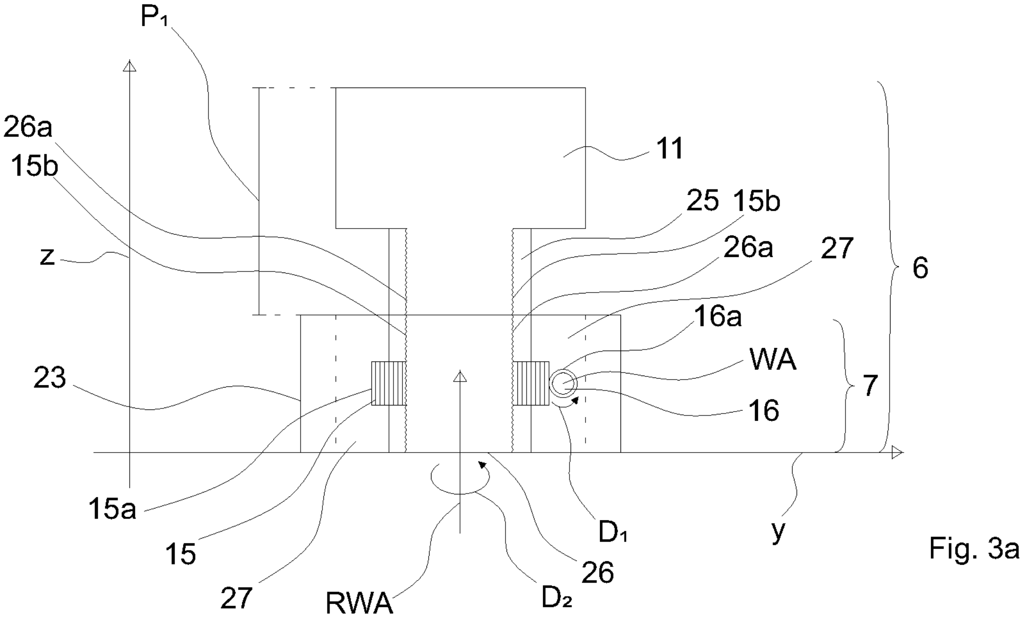
FIG. 3*a* shows a schematic representation of a positioning device of an impact bar according to a second embodiment of the invention in a first position.
Figure 3B:
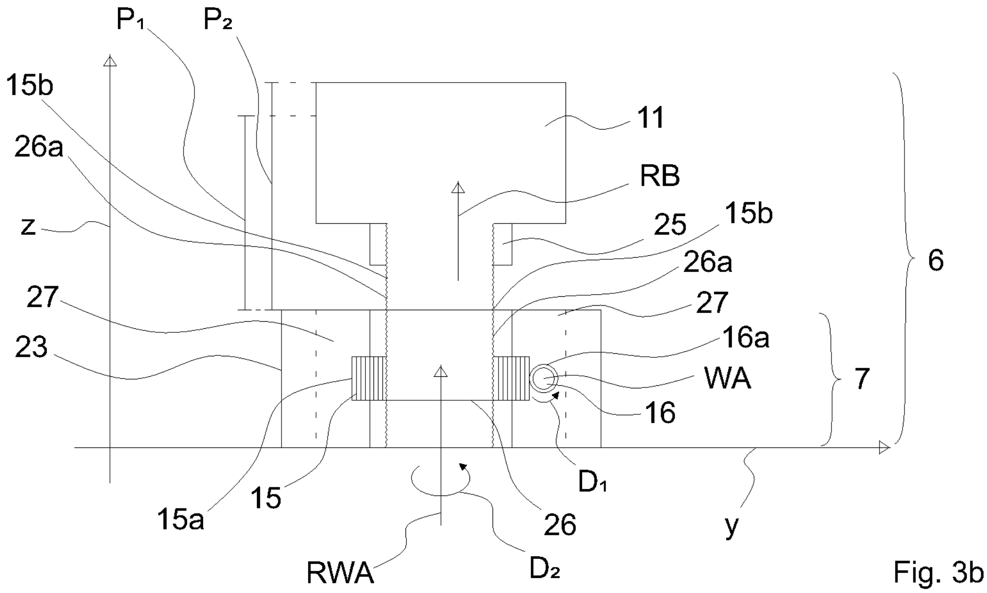
FIG. 3*b* shows a schematic representation of a positioning device of an impact bar according to a first embodiment of the invention in a second position.

FIGS. 3*a* and 3*b* show schematic representations of the positioning device illustrated in FIG. 3 in a first set position P1 and a second set position P2. The positions P1 and P2 correspond to the starting position and desired set position of the positioning device 6 defined in FIGS. 2*b* and 2*c*. The position P2 can be set by the rotation on the worm shaft 16 about its own shaft axis WA, wherein due to its meshing with the worm gear 15 the worm shaft 16 also rotates this about its own gear axis RWA. The gear axis RWA and the shaft axis WA are arranged perpendicular to one another, with the gear axis running parallel to the displacement axis z.

During rotation of the worm shaft 16 a first rotary movement D1 is produced, which is transmitted by the thread 16*a* to the teeth 15*a* of the worm gear 15. In this way the worm gear 15 is rotated about its gear axis RWA and a second rotary movement D2 is produced. Due to the second rotary movement D2 a screw thread 15*b* arranged inside the worm gear 15 and a screw thread 26*a* of the screw element 26 are displaced upwards in a relative movement RB along the displacement axis z.

Figure 4:
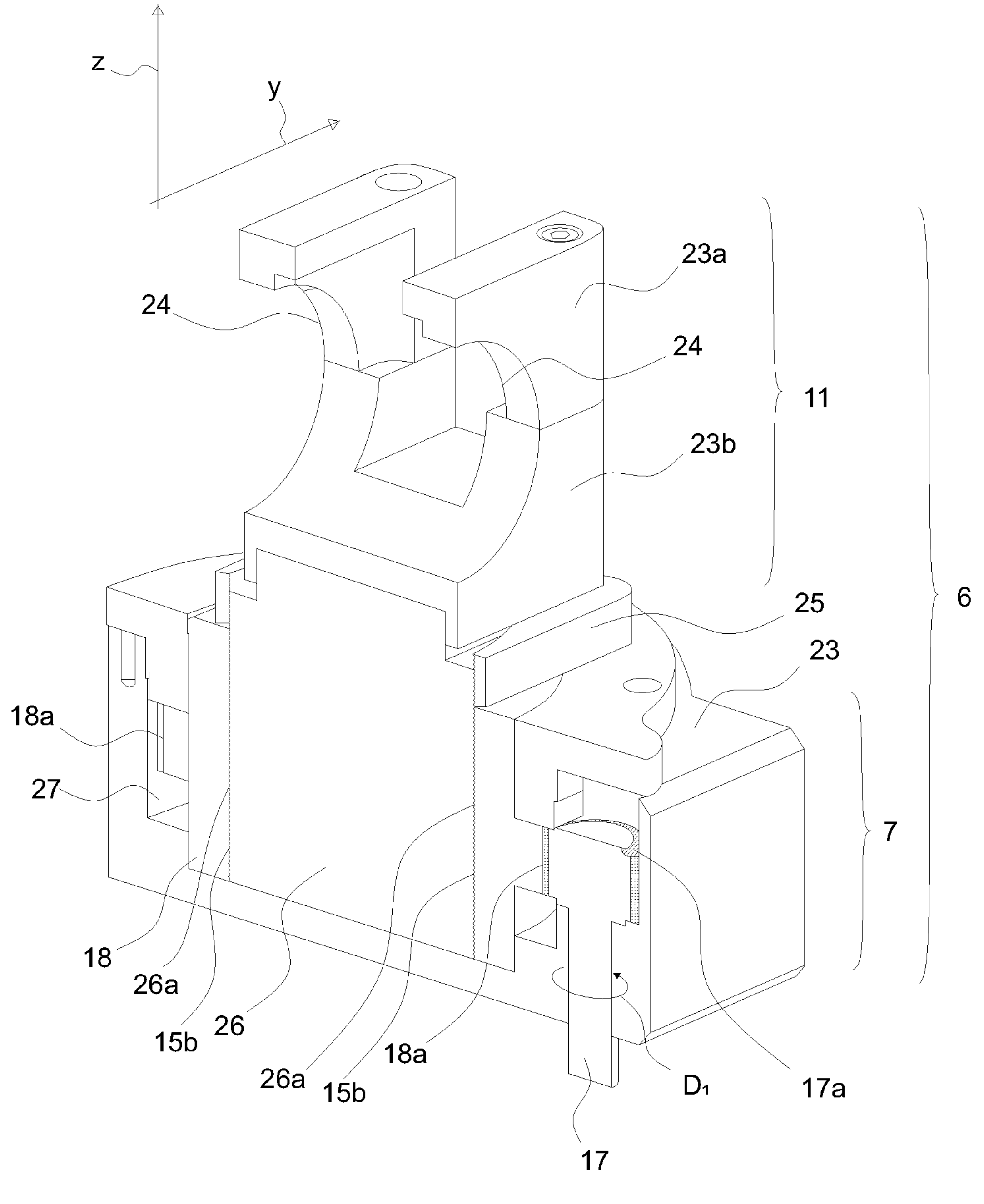
FIG. 4 shows a perspective cross-sectional representation of a positioning device of an impact bar according to a third embodiment of the invention.

FIG. 4 shows a perspective cross-sectional representation of a positioning device 6 of an impact bar 5 according to the third embodiment of the invention. The positioning device 6 has a positioning mechanism 7 which represents a spur gear unit. The positioning mechanism 7 has a spur gear shaft 17 and a spur gear 18, wherein the spur gear shaft 17 is meshed via its teeth 17*a* with the teeth 18*b* of the spur gear 18. The illustrated positioning device 6 is similar to the positioning device illustrated in FIG. 3. A significant difference is that the spur gear shaft 17 rotates about a shaft axis running parallel to the spur gear axis RWA. The spur gear axis RWA and the shaft axis WA both extend parallel to a displacement axis z.

Figure 5:
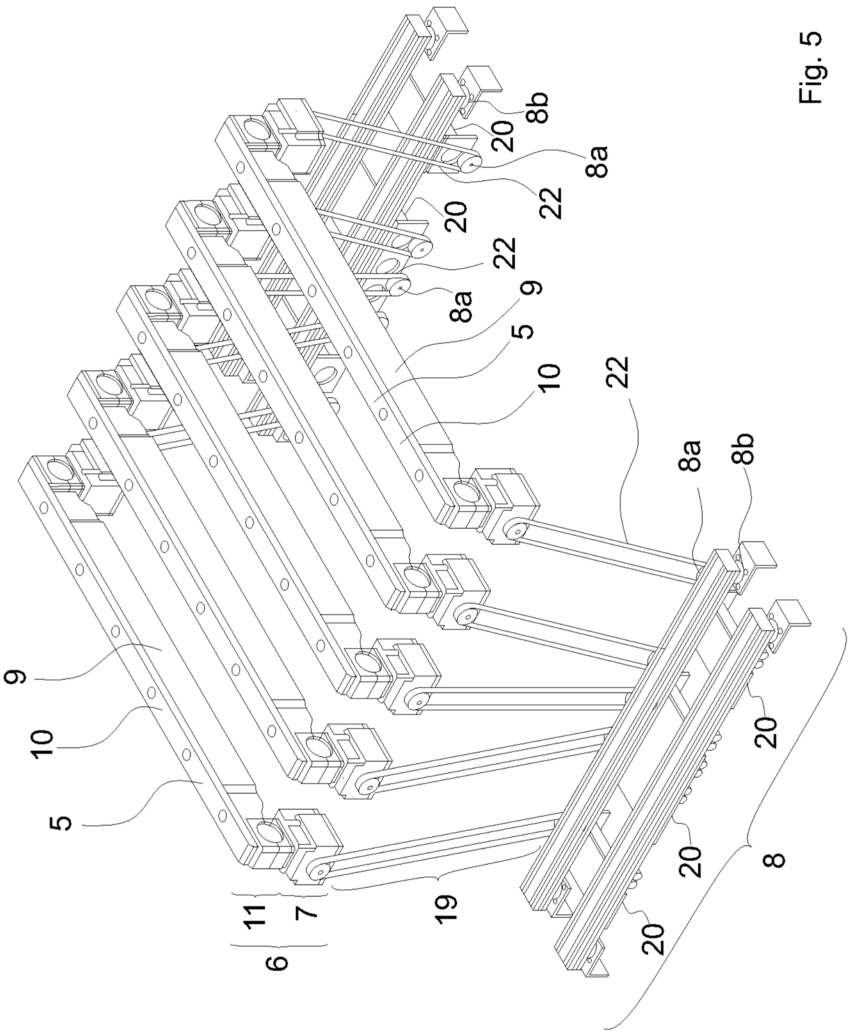
FIG. 5 shows a perspective representation of positioning devices with torque transmission devices according to an embodiment of the invention.

FIG. 5 shows a perspective representation of the positioning devices 6 shown in FIG. 1 with torque transmission devices 19. In the drawing the torque transmission devices 19 constitute toothed belts 21. The positioning devices 6 are driven by a drive unit 20 via toothed belt pulleys or toothed belt wheels 8*a* and a torque transmission device 19. The retaining device 8 preferably has a plurality of vibration dampers 8*b* which protect the individual components against vibrations during the production process. The second torque transmission device, the deflecting gear wheels 8*a* and the drive unit 20 could be fastened to a retaining device 8. The number of toothed belt pulleys or toothed belt wheels 8*a* corresponds in this case to the number of positioning devices 6, so that each positioning device 6 positions the positioning mechanism 7 by means of its own torque transmission device 19 and the toothed belt pulleys or toothed belt wheels 8*a* in order to obtain a displacement of the impact bars 5 relative to the vibrating table bars 4. In the illustrated embodiment of the invention ten drive units 20 are each arranged below the retaining device 8.

The impact bars 5 each have a support bar 9 and a wear bar 10, each of the support bars 9 being screwed inside the fastening devices 11 between two bearing shells 23*a*, 23*b*. The wear bars 10 are firmly screwed in each case above the fastening devices 11.

Figure 6:
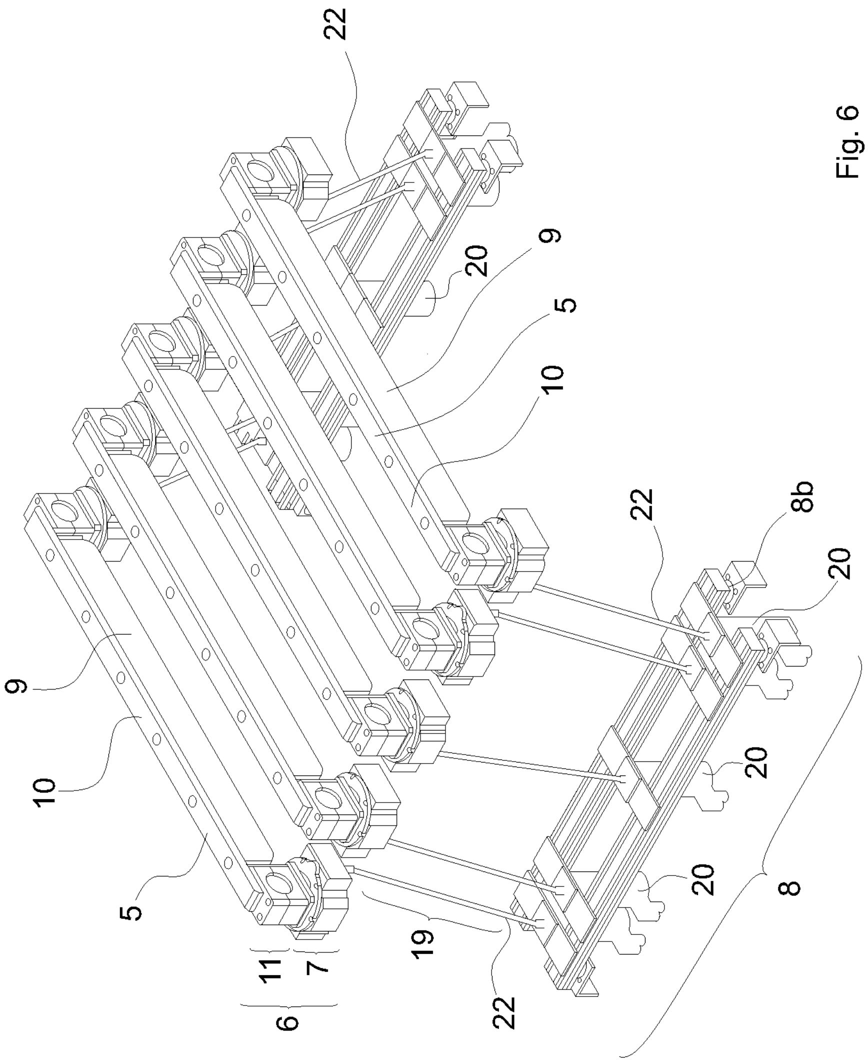
FIG. 6 shows a perspective representation of positioning devices with torque transmission devices according to a further embodiment of the invention.

FIG. 6 shows a perspective representation of the positioning devices 6 illustrated in FIG. 3 with torque transmission devices 19 according to a further embodiment of the invention. In the drawing the torque transmission devices 19 constitute cardan shafts 22. The cardan shafts 22 are advantageously combined with the spur gear units as positioning devices 6.

Figure 7A:
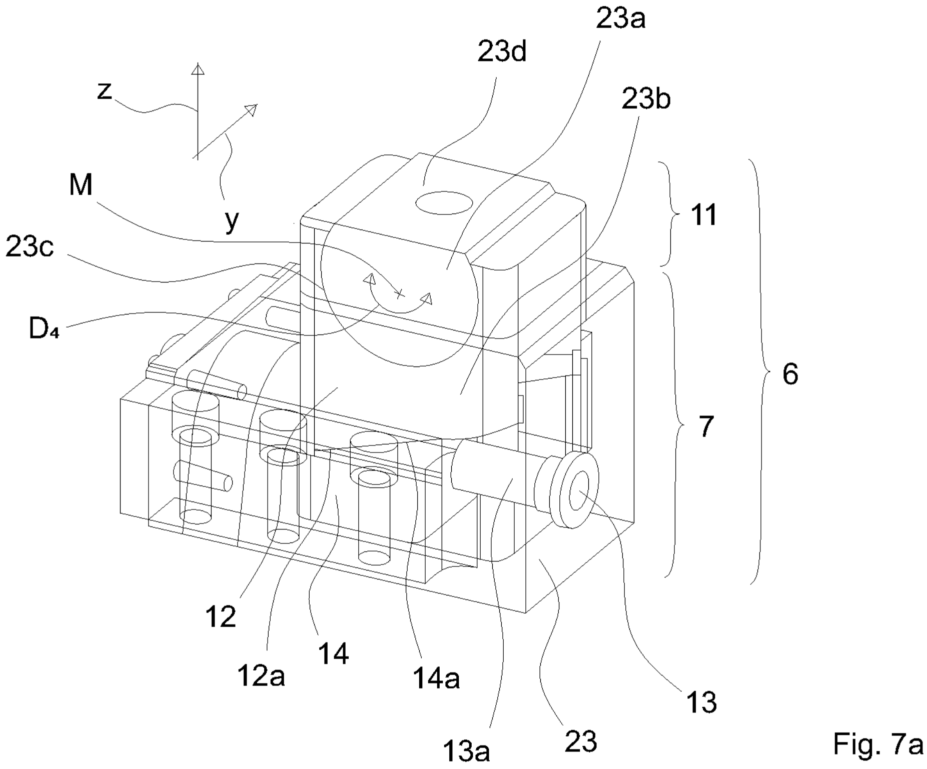
FIG. 7*a* shows a perspective transparent representation of a positioning device of an impact bar according to a further embodiment of the invention.
Figure 7B:
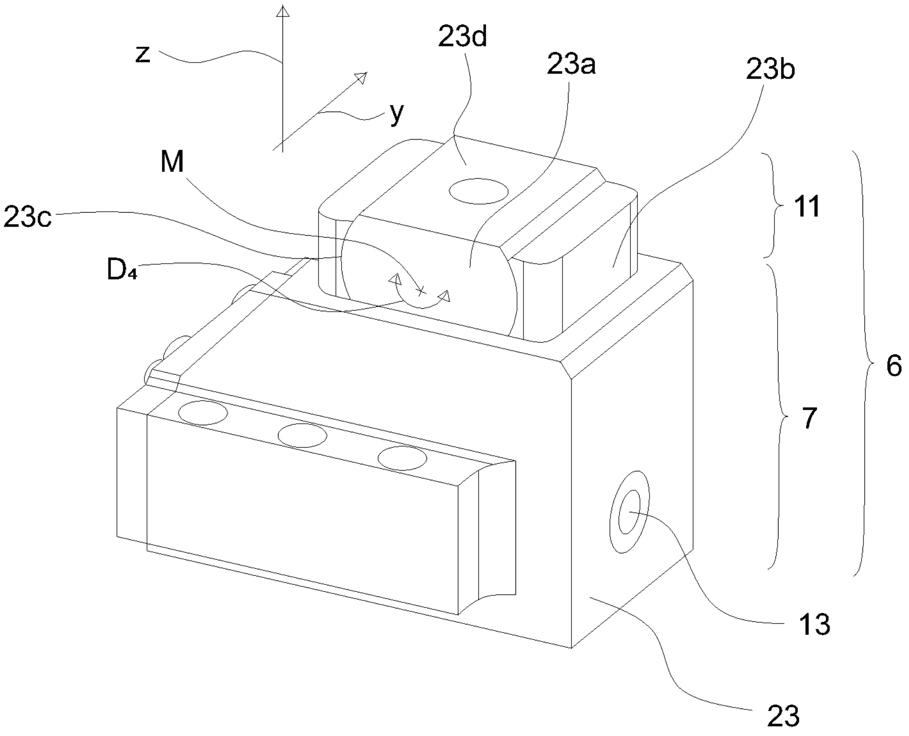
FIG. 7*b* shows a perspective representation of a positioning device of an impact bar according to an embodiment shown in FIG. 7*a* as a solid body.

FIG. 7*a* shows a transparent perspective view of a positioning device 6 of an impact bar 5 according to a further embodiment of the invention. FIG. 7*b* shows the same positioning device 6 as a full body. The illustrated positioning device 6 is substantially similar to the positioning device from FIG. 2. Consequently the positioning device 6 likewise has a fastening device 11 for the impact bar 5 and a positioning mechanism 7 which is installed in a housing 23.

The fastening device 11 preferably has a first fastening element 23*a* and a second fastening element 23*b*, wherein the second fastening element 23*b* has a bore 23*c*, preferably a partially open bore, in which the first fastening element 23*a* can be used. The second fastening element 23*b* has substantially a shape of a cuboid which can be partially fitted in a housing 23. The part of the second fastening element 23*b* which can be fitted into the housing 23 preferably has a wedge element 12 with an oblique lower surface 12*a*. As explained in FIG. 2, this surface 12*a* is a part of the positioning mechanism 7. The first fastening element 23*a* can be inserted at least partially into the part of the second fastening element 23*b* located outside the housing 23.

The first fastening element 23*a* is preferably shaped substantially as a cylinder. It is conceivable that the peripheral surface of the first fastening element 23*a* has a planar surface 23*d* which can be arranged outside the second fastening element 23*b*.

It is conceivable that by such a fastening device 6 an impact bar 5 can be set at an angle with respect to the vibrating table bar 6 by rotating the first fastening element 23*a* inside the second fastening element 23*b* about a centre axis M of the first fastening element 23*a*. Such a rotary movement D4 about the centre axis M is preferably suitable and intended for setting an angle of inclination of the surface of the impact bar 5. As a result the impact bar 5 can be set particularly simply in a desired oblique position.

LIST OF REFERENCES

1 vibrating device
2 vibrating table
3 machine frame
4 vibrating table bars
5 impact bars
6 positioning device
7 positioning mechanism
8 retaining device
8*a* toothed belt pulley/toothed belt wheel
9 support bar of an impact bar
10 support bar of an impact bar
11 fastening device
12 upper wedge element
12*a* oblique lower surface of the upper wedge element
13 shaft
13*a* thread of the shaft
14 lower wedge element
14*a* oblique upper surface of the lower wedge element
14*b* thread of the lower wedge element
15 worm gear
15*a* teeth of the worm gear
15*b* screw thread inside the worm gear
16 worm shaft
16*a* thread of the worm shaft
17 spur gear shaft
17*a* gears of the spur gear shaft
18 spur gear
18*a* teeth of the spur gear
19 torque transmission device
20 drive unit
21 cardan shaft
22 toothed belt
23 housing
23*a* upper bearing shell/first fastening element
23*b* lower bearing shell/second fastening element
23*c* ¾ bore
24 recess in the fastening device
25 bearing element
26 screw element
26*a* screw thread of the screw element
27 cavity in the housing
28 concrete block manufacturing machine
Z displacement axis
Y axis running parallel to the impact bar
X axis running perpendicularly to the impact bar and the displacement axis
D1 first rotating movement
D2 second rotating movement
D4 rotating movement about the centre axis
M centre axis of the upper bearing shell
WA shaft axis
RWA gear axis
RB1 first rotating movement
RB2 second rotating movement
P1 first setting position of the positioning device/starting position
P2 second setting position of the positioning device/desired setting position

The invention claimed is:

1. A vibration device for a concrete block manufacturing machine for compression of a material to be compressed, wherein the vibration device comprises a vibrating table, a machine frame, at least one electric motor, a plurality of positioning devices, and at least one common drive unit, wherein the vibration device is at least partially resiliently mounted on the machine frame and driven by the at least one electric motor and as a result the vibrating table can be set in a predominantly vertical vibrating movement, wherein the vibration device has a plurality of vibrating table bars arranged parallel to one another and fastened to the vibrating table and impact bars fastened statically to the machine frame, wherein all the impact bars are displaceable relative to the vibrating table bars and along a displacement axis running parallel to the vertical vibrating movement by the plurality of positioning devices connected to one another and driven by the at least one common drive unit in order to obtain a displacement of all the impact bars, wherein the vibration device is adapted to adjust the surface of each impact bar by the plurality of positioning devices in an angle of inclination with respect to the horizontally oriented vibrating table bars.

2. The vibration device according to claim 1, wherein the vibration device is adjustable in such a way that in a standby state the impact bars are arranged below the vibrating table bars or span a common plane.

3. The vibration device according to claim 2, wherein all of the impact bars have a wear bar connected to a support bar, and the support bar is connected by at least one fastening device to at least one positioning mechanism.

4. The vibration device according to claim 3, wherein the positioning mechanism has an upper wedge element and a lower wedge element connected to a shaft, wherein the lower wedge element is displaceable along an axis extending parallel to the impact bars by the rotation of the shaft, and as a result the upper wedge element is adjustable along the displacement axis, the upper wedge element sliding on the underside along an oblique upper surface of the lower wedge element.

5. The vibration device according to claim 4, wherein the upper wedge is connected to a fastening element of the fastening device in order to displace the impact bars along the displacement axis.

6. The vibration device according to claim 3, wherein the positioning mechanism has a worm gear and a worm shaft, wherein the fastening device connected to the worm gear is adjustable along the displacement axis by the rotation of the worm shaft, the worm gear being meshed on the front face with the worm shaft.

7. The vibration device according to claim 3, wherein the positioning mechanism has a spur gear meshed with a spur gear shaft and connected to the fastening device, wherein the fastening device is adjustable along the displacement axis by the rotation of the spur gear shaft.

8. The vibration device according to claim 3, wherein the positioning device has a torque transmission device which indirectly connects the positioning mechanisms to the drive unit in a retaining device arranged alongside and/or below the vibrating table.

9. The vibration device according to claim 8, wherein the torque transmission device has a cardan shaft which is configured for transmission of a torque to the positioning devices.

10. The vibration device according to claim 8, wherein the torque transmission device has a cardan shaft which is configured for transmission of a torque to the positioning devices.

11. The vibration device according to claim 8, wherein the positioning device has an angular gear which transmits the torque predetermined by the drive unit to the positioning mechanism by an angle, the angular gear being connected to the torque transmission device.

12. The vibration device according to claim 9, wherein the positioning device has an angular gear which transmits the torque predetermined by the drive unit to the positioning mechanism by an angle, the angular gear being connected to the torque transmission device.

* * * * *